Jan. 15, 1929.  S. BACHMANN  1,699,269
BOX
Filed Aug. 1, 1925   3 Sheets-Sheet 1
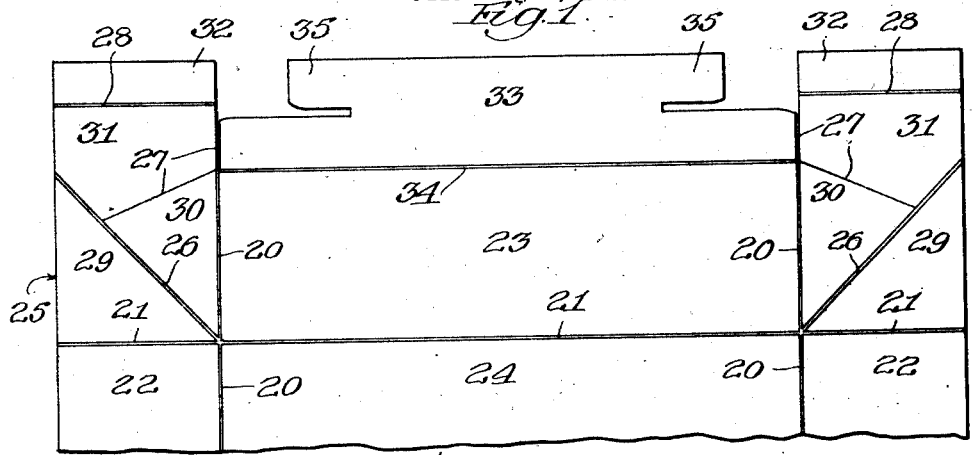
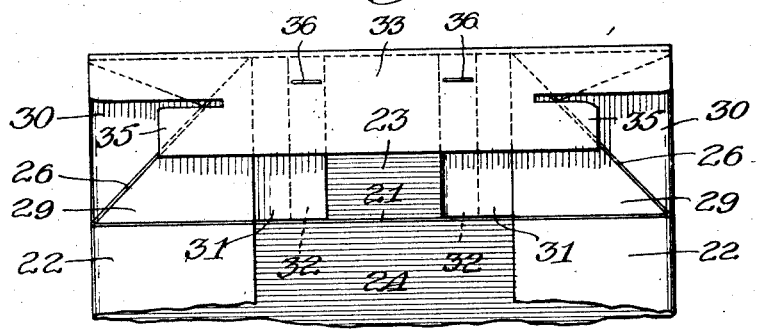
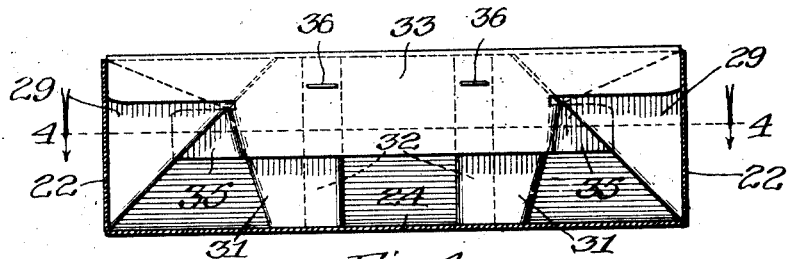
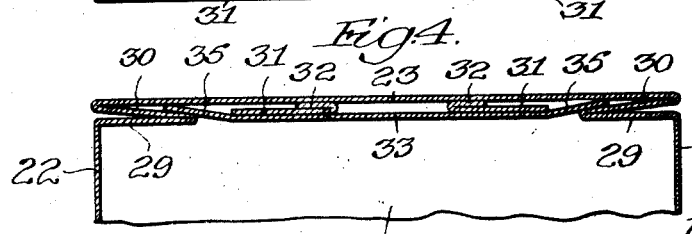
Inventor:
Siegmund Bachmann Jan. 15, 1929.  S. BACHMANN  1,699,269
BOX
Filed Aug. 1, 1925   3 Sheets-Sheet 2
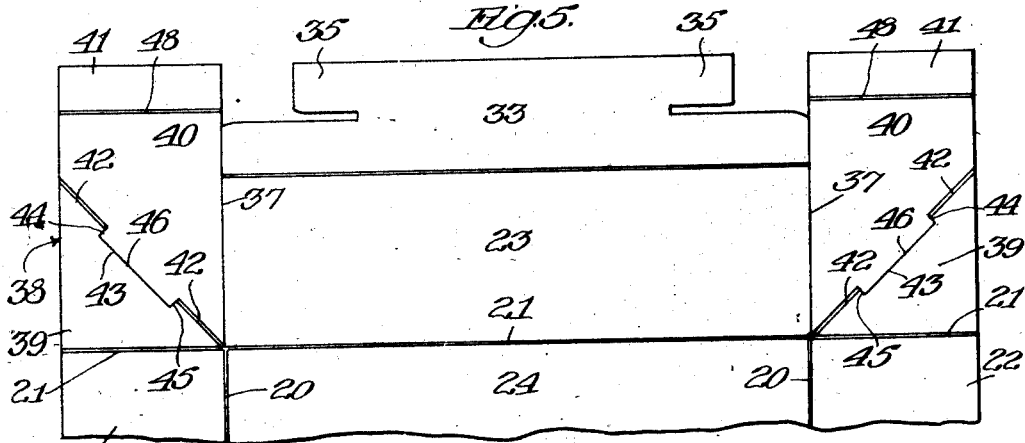
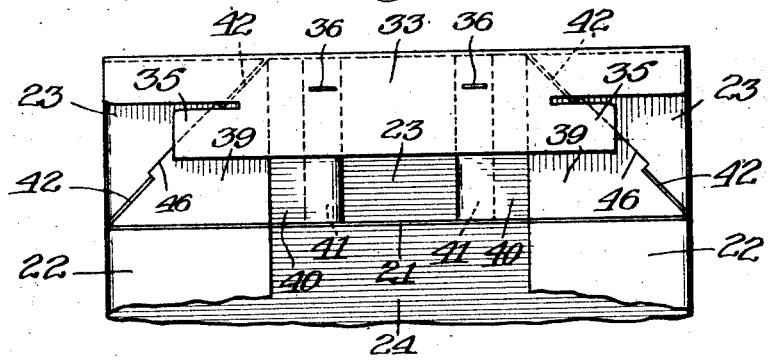
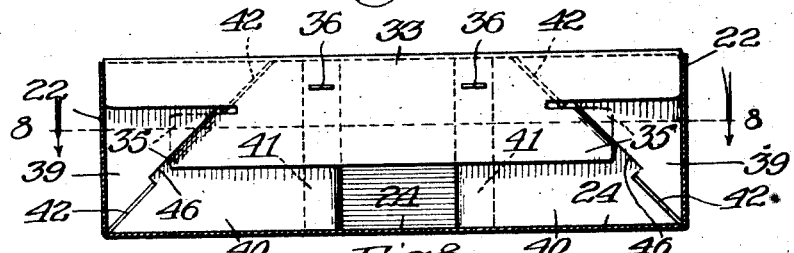
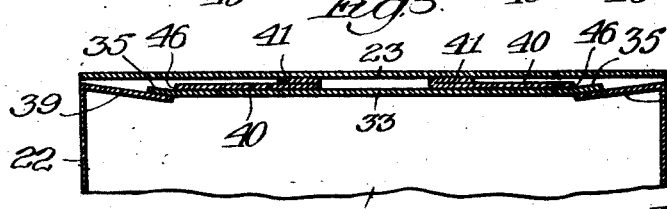
Inventor:
Siegmund Bachmann, Jan. 15, 1929.　　　　　　　　　　　　　　　　　　　　　1,699,269
S. BACHMANN
BOX
Filed Aug. 1, 1925　　　　3 Sheets-Sheet 3
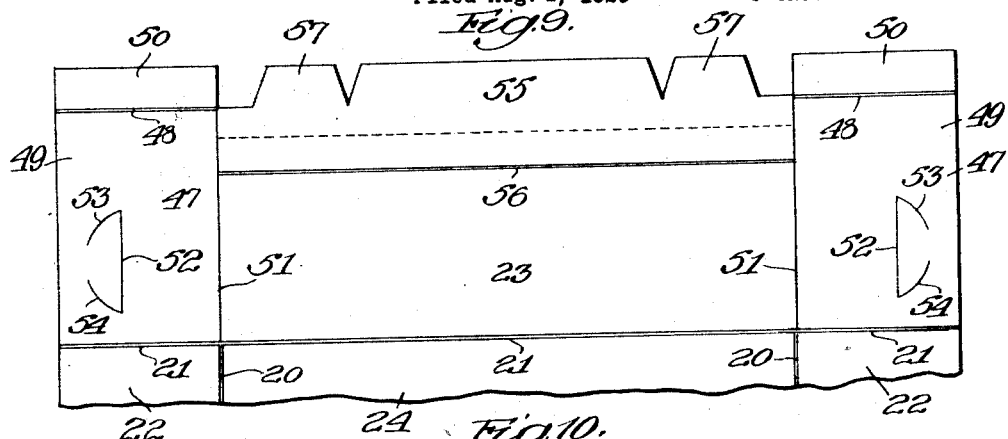
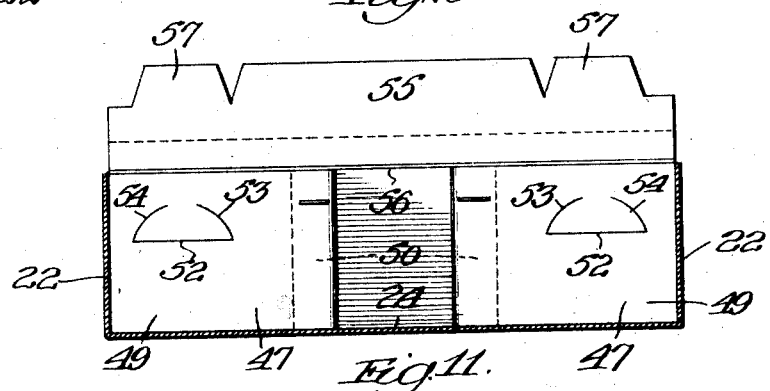
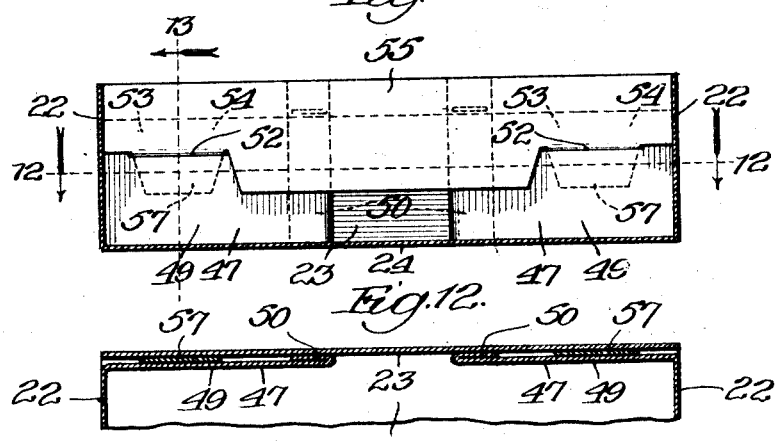
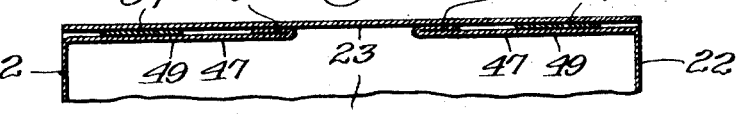
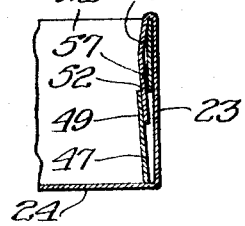
Inventor:
Siegmund Bachmann Patented Jan. 15, 1929.

1,699,269

UNITED STATES PATENT OFFICE.

SIEGMUND BACHMANN, OF CHICAGO, ILLINOIS.

BOX.

Application filed August 1, 1925. Serial No. 47,555.

My invention relates, generally stated, to boxes of box-board, or the like, formed from blanks folded into box-forming condition, and more particularly to boxes of the type comprising corner-extensions at ends of side walls of the box which, in the erected condition of the box, lie flatwise against certain of the side walls thereof.

One phase of my invention relates to boxes of the type above referred to with tongues provided on walls of the box which interlock with the corner extensions, my object in this connection being to provide a construction whereby insertion of the tongues into such interlocked position may be readily effected and the boxes be rendered economical of construction.

Another phase of my invention relates to boxes of the general type above referred to, with portions of the corner extensions flatwise opposing walls of the box and of a height substantially equal to the latter for reenforcing these walls against crushing, my object in this connection being to provide novel, simple, and highly effective means for performing this function.

Another phase of my invention relates to boxes of the general type above referred to with portions of the corner extensions flatwise opposing walls of the box and of a height substantially equal to the latter for reenforcing these walls against crushing and with tongue-equipped flaps on those walls of the box which are flatwise opposed by the corner extensions, the flaps overlapping these corner extensions, and the tongues interlocking with the latter, my object in this connection being to provide a construction of box of the character stated which will present a high degree of resistance to crushing of its side walls and collapsing of the box, and permit of the ready insertion of the tongues to interlocked position relative to the corner extensions.

Referring to the accompanying drawings:—

Figure 1 is a face view of one end of a blank from which a so-called uncut-corner box construction embodying my improvements may be constructed. Figure 2 is a similar view showing the blank folded into a position for forming the box in collapsed condition. Figure 3 is a view in vertical section of the box in erected condition, showing one of the flap-equipped side walls in elevation. Figure 4 is a plan section taken at the line 4—4 on Fig. 3 and viewed in the direction of the arrow. Figure 5 is a view like Fig. 1 of one end portion of a blank from which a box of the so-called cut-corner type, and embodying my invention, may be constructed. Figure 6 is a view like Fig. 2 showing the blank of Fig. 5 folded into a position in which the box is in collapsed condition. Figure 7 is a view like Fig. 3 of the box formed from the blank of Figs. 5 and 6. Figure 8 is a plan section taken at the line 8—8 on Fig. 7 and viewed in the direction of the arrow. Figure 9 is a view like Fig. 1 of one end portion of a blank from which a box of the non-collapsible type, and embodying my invention, may be constructed. Figure 10 is view in vertical sectional elevation of the box in erected condition, showing one of the flap-equipped walls in elevation with the flap thereon in raised position. Figure 11 is a view like Fig. 10 of the structure therein shown showing the flap interlocked with the corner extensions. Figure 12 is a broken plan sectional view taken at the line 12—12 on Fig. 11 and viewed in the direction of the arrows; and Figure 13 a similar view taken at the line 13 on Fig. 11 and viewed in the direction of the arrow.

Each of the constructions of box selected for illustrating a different embodiment of my invention, involves, generally stated, a rectangular base having four side walls, or two sets of opposed walls, with corner-portions, or extensions, connected with side walls of the box and extending therefrom into a position in which they flatwise oppose side walls of the box.

Referring particularly to the embodiment illustrated in Figs. 1, 2, 3 and 4, one end of the blank from which the box is constructed is represented in Fig. 1, this blank consisting of a rectangular sheet of boxboard adapted to be folded along the parallel folding lines 20 and 21 (the folding line 21 at one edge portion only of the blank being shown,) to form the box sides 22 and 23 (one only of which latter is shown), respectively, hingedly connected with the rectangular base portion 24, these folding lines, by preference, being creases to facilitate folding the parts. The lines 20 intersect the lines 21 to form the four corner portions, or extensions, 25 of the box, the corner extensions at one end only of the box being shown, but which corner extensions are duplicated at the opposite end of the box. These corner extensions are hingedly connected with the ends of the walls 22 and 23 through the medium of those portions of the folding lines 20 and 21 which extend beyond their intersection with each other, as represented in Fig. 1. Each corner extension 25 contains a diagonal folding line 26 and is slit along an irregular line 27 leading from the outer edge of the blank to the folding line 26, and presents a folding line 28 adjacent its outer edge-portion, whereby each corner-extension is formed into four sections 29, 30, 31 and 32. On each wall 23 is a flap 33 of a length approximately equal to the length of the wall carrying it, these being foldable inwardly toward the walls 23 along folding lines 34 beyond which lines the sections 31 extend as represented in Fig. 1. Each flap 33 is formed along its free edge with tongue portions 35 extending in opposite directions and lengthwise of the flap.

The box may be formed from the blank described by turning the walls 22 and 23 to upright position in which they extend at right angles to the base 24, the sections of each corner-extension 25, in this operation, folding inwardly along that portion of the diagonal line 26 which extends from the line 27 to the point of intersection between the lines 20 and 21 and along the extremities of the folding lines 20 and 21 to a position in which the sections 29 and 30 lie flatwise together, with their outer faces in contact, against the walls 23, and the sections 31, carried by the sections 29, substantially parallel with the walls 23, as illustrated in Figs. 3 and 4, the sections 31 being of substantially the same height as those walls which they flatwise oppose. The sections 32 in the folding of the corner-extensions are turned back so that they extend, in the erected condition of the box, between the sections 31 and the walls 23, as shown. The flaps 33 may then be turned inwardly to flatwise oppose the inner faces of the walls 23, and the tongues 35 tucked into the spaces provided between the flatwise opposed sections 29 and 30 and the walls 23, at each corner of the box, as shown in Figs. 3 and 4.

By preference the flaps 33 are connected between the tongues 35 to the walls carrying them, as for example by staples represented at 36 which are shown as extending through the flaps, the sections 31 and 32 of the corner-extensions and the walls 13.

When it is desired that the box be collapsed or reduced to "knock down" condition, the tongues 35 are disengaged from the corner-extensions by flexing them out of engagement therewith, and, where the flaps 33 are secured at their free edge portions to the side walls 23 as stated, as for example by the staples 36, the upper end portions of the flaps are flexed upwardly to permit the corner-extensions to be unfolded. In thus manipulating the box the side walls 22 are swung inwardly and downwardly to flatwise oppose the inner face of the base portion 24, and the end walls 23 are swung outwardly and downwardly, the parts assuming the position shown in Fig. 2, it being noted that in so manipulating the box the sections 29 of the corner-extensions swing, at the diagonal folding lines 26, relative to the sections 30, 31 and 32.

The box is righted from the position illustrated in Fig. 2 to that illustrated in Figs. 3 and 4 by swinging the walls 23 upwardly and inwardly and the walls 22 upwardly and outwardly upon the base 24, the sections 29 in this operation turning at their hinged connections with the walls 22 and the sections 30, 31 and 32 and folding to the position illustrated in Figs. 3 and 4. During the operation of swinging the walls as described, the operator flexes the ends of the flaps 33 for moving them out of the path of movement of the upper edges of the sections 29, whereby the latter may be folded into the position illustrated, these end portions, in the erected position of the box, overlying the sections 29. Thereupon the tongues 35 are inserted into interlocked position relative to the corner-extensions, as above referred to.

It will be understood from the foregoing that the box may be erected either as first described above, or it may be produced in the "knock down" condition shown in Fig. 2, and the fastening means, such as the staples referred to, applied, before erecting the box, it being preferable in practice to provide the box in "knock down" condition not only for convenience of shipment but also for convenience of the user.

Referring to the constructions shown in Figs. 5, 6, 7 and 8, in which my invention is illustrated as embodied in a box of the cut-corner type, the blank, one of the two similar ends of which only is shown, from which the box is formed, is represented in Fig. 5, and is of the same construction as the blank shown in Fig. 1, excepting that the slits 27 are omitted and the lines 20 beyond their intersections with the lines 21 are slit as represented at 37 instead of forming folding lines. Thus the corner-extensions of this box represented at 38, two only of the four similar ones of which are illustrated, are formed of but three sections 39, 40 and 41, instead of four, the sections 40 being separated from the ends of the walls 23 and hingedly connected with the sections 39 along the diagonal folding lines represented at 42 and corresponding with the diagonal folding lines 26 of the structure shown in the preceding figures. Each diagonal folding line 42 instead of being provided as a continuous line as in the case of the line 26, is provided in sections and intermediate these sections the corner-extension is slit along the lines 43, 44 and 45, which slit, when the sections 39 and 40 extend at an angle to each other, presents an opening 46, these openings in the several corner-extensions, being so positioned as to adapt them to receive the tongues 35 on the flaps 33, as shown in Figs. 7 and 8.

To form the box, from the blank of Fig. 5, the walls 22 and 23 are turned upwardly at their hinged connections with the base 24 to a position in which they extend at right angles to the base, the corner-extensions 38 being turned inwardly by the operator upon the extremities of the lines 21 and the lines 48 to a position in which they flatwise oppose the inner surfaces of the walls 23, with the sections 41 extending between the sections 40 and the walls 23, in which position the sections 40, which are of a height substantially equal to the latter, flatwise oppose the walls 23. The flaps 33 are then turned inwardly and downwardly to overlie the corner-extensions and the tongues 35 tucked through the openings 46 into a position in which they underlie the sections 39.

The flaps 33 may be permanently secured between their ends to the walls 23 if desired, as for example by the means referred to in connection with the construction of the preceding figures, or in any other desirable way.

The blanks of Figs. 5, 6, 7 and 8 may, if desired, be folded in the first instance to "knock down" box condition as shown in Fig. 6 and as explained of the structure of the preceding figures.

The construction of box shown in Figs. 1 to 4, inclusive, by virtue of the provision of the portion of the diagonal folding lines 26 which extend from the slits 27 to the outer edges of the extensions 25, and the construction of box shown in Figs. 5 to 8, inclusive, by virtue of the diagonal folding lines 42, adapts both of these constructions to be manipulated from blank form shown in Figs. 1 and 5 directly into erected-box condition as described and thereafter collapsed into the condition shown in Figs. 2 and 6, when desired, or first manipulated into the condition shown in Figs. 2 and 6 and thereafter erected into erected-box condition. If, however, it is not desired that the box be first manipulated into the condition shown in Figs. 2 and 6, respectively, or, after being produced in erected condition direct from the blank, it is not desired that the box be manipulated into collapsed condition, the above-referred-to portions of the diagonal folding lines 26 and the diagonal folding lines 42, may be omitted.

Referring now to the construction shown in Figs. 9 to 13, inclusive, which illustrates one phase of my invention as embodied in a box of the non-collapsible type; the blank, one of the two similar ends only of which is shown, from which the box is formed, is represented in Fig. 9 and presents the base portion 24 and surrounding side walls 22 and 23 hingedly connected with the base 24 at the folding lines 20 and 21, respectively, as explained of the blanks of the preceding drawings. The blank at each corner presents a corner-extension-forming portion 47 containing a folding line 48 adjacent its outer end causing the corner-extensions to be formed of two sections 49 and 50 hingedly connected together at 48, the corner-extension 47 being hingedly connected with the ends of the walls 22 along extensions of the folding lines 21, and severed from the walls 23 along the slits 51 extending to the intersections of the folding lines 20 and 21. Each corner extension 47 is slit along the straight lines 52 and the curved lines 53 and 54 to provide tongue-receiving openings. The outer edges of the walls 23 carry flaps 55 hingedly connected thereto along folding lines 56, these flaps being provided along their free edges, adjacent their ends with tongues 57.

To form the box from the blank of Fig. 9, the walls 22 and 23 are turned upwardly at their hinged connections with the base 24 to a position in which they extend at right angles to the base, the corner-extensions 47 being turned inwardly by the operator upon the extremities of the lines 21 and the lines 48 to a position in which they flatwise oppose the inner surfaces of the walls 23, with the sections 50 extending between the sections 49 and the walls 23. The flaps 55 are then turned inwardly and downwardly to overlie the corner-extensions and the tongues 57 tucked through the openings provided by the slits 52, 53, and 54 into a position in which they underlie the sections 49.

As regards the structures shown in Figs. 1 to 8, inclusive, the combining of the interlock between the tongues and corner-extensions as stated, with the feature of re-enforcing the flap-equipped walls of the box by corner-extensions of substantially the same height as these walls, the box is rendered very secure against accidental unfolding or collapsing, even, when the box, in weighted condition, is supported by one hand only of a person grasping a wall of the box.

The provision of the terminal sections 32, 41 and 50 of the several constructions shown, presents a number of advantages; these sections turn on the sections carrying them to extend either at the inner or outer face of the last-referred-to sections and where provided of a height, as shown, equal substantially to that of the height of the walls which they flatwise oppose, serve to augment the re-enforcing of such walls against crushing. Where these terminal sections are interposed between the sections carrying them and adjacent walls of the box as shown in the drawings, they serve, in addition to augmenting the resistance of the box walls to crushing where of a height equal to the box walls, to space those portions of the corner-extensions with which the tongues interlock, from the end walls which they flatwise oppose, and thus facilitate the introduction of the tongues into interlocked position relative to the corner extensions, this feature in a box of the construction shown in Figs. 9 to 13, inclusive, rendering unnecessary the stripping of those portions of the corner-extensions which are bounded by the lines 52, 53 and 54.

The inner end portions of the corner-extensions of the various constructions shown may or may not be permanently connected with the walls 23, as desired, and when it is desired to connect them, this may be done in any suitable manner, as by gluing or stapling them to such walls with the terminal portions 32, 41 or 50 unfolded, or folded to overlap either faces of the sections carrying them, and where these terminal sections flatwise oppose the walls 23, as shown, they may be glued to these walls.

Furthermore, as regards the construction shown in Figs. 1 to 8, inclusive, it will be understood from the foregoing description that by providing for the interlock of the tongues on the flaps with portions of the corner-extensions produced at the diagonal folding lines thereof, the tongues may, in the erecting of the box, be inserted into interlocking position with great ease and without liability of impairing parts of the box. This feature of the construction is present regardless of the provision of the terminal portions 32 or 41, though the provision of these terminal portions folded to lie against the inner surfaces of the walls 23, increases the facility with which the tongues may be inserted. In this connection it will be understood that so far as certain features of my invention are concerned, the provision of the hinged terminal sections referred to are not necessary.

While I have illustrated and described certain particular constructions embodying my invention, I do not wish to be understood as intending to limit it thereto, as the same may be greatly modified and altered, and the invention be embodied in other forms without departing from the spirit of the invention.

What I claim as new, and desire to secure by Letters Patent, is:

1. A box, comprising a base having opposed walls hingedly connected thereto, corner-extensions on walls of the box formed of sections hingedly connected together along diagonal folding lines and forming corners of the box and flatwise opposing certain walls thereof, portions of said corner-extensions extending inwardly beyond said diagonal folding lines and being of substantially the same height as the walls they flatwise oppose, and flaps on opposed walls of the box and overlying said extensions and having portions insertable into interlocked position relative to said corner-extensions at portions of the latter adjacent said folding line.

2. A box, comprising a base having opposed walls hingedly connected thereto, corner-extensions on walls of the box formed of sections hingedly connected together along diagonal folding lines and forming corners of the box and flatwise opposing certain walls thereof, portions of said corner extensions extending inwardly beyond said diagonal folding lines and being of substantially the same height as the walls they flatwise oppose and secured to be stationary relative to said last-referred-to walls, and flaps on opposed walls of the box and overlying said extensions and having portions insertable into interlocked position relative to said corner-extensions at portions of the latter adjacent said folding lines, said flaps being secured between said last-referred-to portions to be stationary relative to the walls carrying them.

3. A box, comprising a base having opposed walls hingedly connected thereto, corner extensions each hingedly connected with adjacent box walls and formed of sections hingedly connected together along diagonal folding lines and forming corners of the box and flatwise opposing certain walls thereof, portions of said corner extensions extending inwardly beyond said diagonal folding lines and being of substantially the same height as the walls they flatwise oppose, and flaps on opposed walls of the box and overlying said extensions and having portions insertable between said corner-extensions and the walls of the box which the latter flatwise oppose, at said diagonal folding lines.

4. A box, comprising a base having opposed walls hingedly connected thereto, corner-extensions each hingedly connected with adjacent box walls and formed of sections hingedly connected together along diagonal folding lines and forming corners of the box and flatwise opposing certain walls thereof, portions of said corner-extensions extending inwardly beyond said diagonal folding lines and being of substantially the same height as the walls they flatwise oppose and secured to be stationary relative to said last-referred-to walls, and flaps on opposed walls of the box and overlying said extensions and having portions insertable between said corner-extensions and the walls of the box which the latter flatwise oppose, at said diagonal folding lines, said flaps being secured between said portions to be stationary relative to the walls carrying them.

SIEGMUND BACHMANN.